United States Patent
Panasik et al.

(10) Patent No.: US 8,505,856 B2
(45) Date of Patent: *Aug. 13, 2013

(54) ANCHOR ASSEMBLY WITH LARGE RANGE OF MOTION SUSPENSION MEMBERS, AND RESTRAINT SYSTEMS FOR SUSPENDED COMPONENTS

(75) Inventors: Cheryl L. Panasik, Elburn, IL (US); Robert Fischer, Roselle, IL (US); Mark Ross, Austin, TX (US); Norbert K. Kolodziej, Park Ridge, IL (US); Andrea M. Basalay, Hoffman Estates, IL (US); Yongping Gong, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/662,980

(22) Filed: May 14, 2010

(65) Prior Publication Data
US 2010/0219317 A1   Sep. 2, 2010

Related U.S. Application Data

(62) Division of application No. 11/802,899, filed on May 25, 2007, now Pat. No. 7,780,134.

(60) Provisional application No. 60/813,333, filed on Jun. 14, 2006.

(51) Int. Cl.
  *F16L 3/00*   (2006.01)
(52) U.S. Cl.
  USPC ........... 248/60; 248/324; 411/372.5; 411/396

(58) Field of Classification Search
  USPC .................... 248/693, 492, 493, 60
  See application file for complete search history.

(56) References Cited

U.S. PATENT DOCUMENTS

| | | | | |
|---|---|---|---|---|
| 969,195 | A * | 9/1910 | Rothstein | 248/493 |
| 1,187,587 | A * | 6/1916 | White | 248/60 |
| 2,785,503 | A * | 3/1957 | Schaefer | 446/227 |
| 3,095,174 | A | 6/1963 | Dehn et al. | |
| 3,204,901 | A * | 9/1965 | Dunu | 248/74.3 |
| 3,313,503 | A * | 4/1967 | Mayr | 248/60 |
| 3,512,743 | A | 5/1970 | Lipscomb | |
| 3,965,938 | A * | 6/1976 | Bauerle et al. | 138/107 |
| 4,448,388 | A | 5/1984 | Dennis et al. | |
| 5,090,654 | A | 2/1992 | Ridings et al. | |
| 5,755,542 | A | 5/1998 | Janusz | |
| 6,003,210 | A * | 12/1999 | Facey et al. | 24/130 |
| 6,032,907 | A * | 3/2000 | Santa Cruz et al. | 248/60 |
| 6,053,457 | A * | 4/2000 | Ozga et al. | 248/58 |

(Continued)

FOREIGN PATENT DOCUMENTS

| | | |
|---|---|---|
| EP | 1350965 | 10/2003 |
| GB | 2361486 | 10/2001 |

*Primary Examiner* — Bradley Duckworth
(74) *Attorney, Agent, or Firm* — Law Offices of Steven W. Weinrieb (57) ABSTRACT

An anchor assembly structured for use in connection with ceiling or roofing structures for hanging industrial or commercial components, such as, for example, electrical conduits, heating units, water pipes for automatic water sprinkler systems, and the like. The anchor assembly is easy and quick to install, and also provides enhanced swivel capabilities or angular ranges of movement so as to accommodate various system and spatial requirements in connection with the suspension of the components. Suspension and lateral restraint systems are also disclosed.

9 Claims, 9 Drawing Sheets

(56) References Cited

U.S. PATENT DOCUMENTS

| | | | |
|---|---|---|---|
| 6,135,397 A * | 10/2000 | Santa Cruz et al. | 248/74.1 |
| 6,202,962 B1 * | 3/2001 | Snyder | 248/60 |
| 6,443,680 B1 | 9/2002 | Bodin | |
| 6,557,805 B1 * | 5/2003 | Snyder | 248/60 |
| 6,604,291 B2 * | 8/2003 | Waibel et al. | 33/283 |
| 6,871,732 B2 * | 3/2005 | Flint et al. | 191/12 R |
| 6,930,250 B1 | 8/2005 | Drane | |
| 6,932,309 B1 * | 8/2005 | Corey et al. | 248/231.9 |
| 7,039,987 B2 * | 5/2006 | van Gijsel et al. | 24/134 R |
| 7,150,078 B2 * | 12/2006 | van Gijsel et al. | 24/115 M |
| 7,213,938 B2 * | 5/2007 | Brondt et al. | 362/225 |
| 7,281,695 B2 | 10/2007 | Jordan | |
| 7,346,962 B2 * | 3/2008 | van Gijsel et al. | 24/134 R |
| 7,445,186 B2 | 11/2008 | Kuhn | |
| 7,510,160 B1 | 3/2009 | Wang | |
| 2001/0050325 A1 * | 12/2001 | Dunay et al. | 248/74.3 |
| 2003/0222468 A1 * | 12/2003 | Brooks | 294/81.5 |
| 2007/0170334 A1 * | 7/2007 | Ambrose | 248/317 |
| 2007/0210230 A1 * | 9/2007 | Pourtier et al. | 248/342 |

* cited by examiner

ANCHOR ASSEMBLY WITH LARGE RANGE OF MOTION SUSPENSION MEMBERS, AND RESTRAINT SYSTEMS FOR SUSPENDED COMPONENTS

CROSS-REFERENCE TO RELATED PATENT APPLICATION

This patent application is a Divisional patent application of prior U.S. patent application Ser. No. 11/802,899, which was filed on May 25, 2007.

This patent application is related to, based upon, and effectively a utility patent application conversion from U.S. Provisional Patent Application Ser. No. 60/813,333, which was filed on Jun. 14, 2006, the filing date benefits of which are hereby respectfully claimed.

FIELD OF THE INVENTION

The present invention relates generally to anchor assemblies, mounting systems, fixtures, or the like, and more particularly to a new and improved anchor assembly, mounting system, fixture, or the like, which is uniquely structured for use in connection with, for example, ceiling or roofing structures in order to hang, suspend, or mount various components necessary to the operation of industrial or commercial establishments, such as, for example, electrical conduits, heating units, water pipes for use in conjunction with automatic water sprinkler systems, or the like, wherein the new and improved anchor assembly, mounting system, fixture, or the like is relatively easy and quick to install, and wherein further, the new and improved anchor assembly, mounting system, fixture, or the like also provides enhanced swivel capabilities or angular range of movement which may be necessary so as to effectively accommodate various or different system and spatial requirements in connection with the achievement of the hanging or suspension of the various components necessary to the operation of the industrial or commercial establishments, such as, for example, the electrical conduits, heating units, water pipes for use in conjunction with the automatic water sprinkler systems, or the like. Also disclosed are various restraint systems for hanging or suspending the various components.

BACKGROUND OF THE INVENTION

Various anchors, fixtures, mounting plates, or the like are of course well-known in connection with the hanging or suspension of various components necessary to the operation of industrial or commercial establishments, such as, for example, electrical conduits, heating units, water pipes for use in conjunction with automatic water sprinkler systems, or the like. For example, in connection with the installation of automatic water sprinkler systems within an industrial or commercial establishment, the water pipes that feed, supply, or conduct the water to the sprinkler heads are usually secured or mounted upon the ceiling or roofing structure by means of suitable hanger hardware which may comprise various different anchors, fixtures, mounting plates, or the like. The hanger hardware must of course be sufficiently strong or secure so as to in fact withstand or support the weight of the water pipes when the water pipes are operationally filled with water. Conventionally, the prior art hanger hardware may comprise, for example, anchor structures, fixtures, or mounting plates which are adapted to be secured to the ceiling or roofing structure by means of suitable screws or bolt fasteners, and the anchor structures, fixtures, or mounting plates comprise internally threaded socket members for threaded engagement by means of externally threaded hanger rods or the like.

Accordingly, in order to hang, mount, or suspend the water pipes within the industrial or commercial establishment, suitable holes or apertures are initially drilled within the ceiling or roofing structures at predetermined locations thereof, the anchor structures, fixtures, or mounting plates are then secured within such holes or apertures by means of the screws or bolt fasteners which also require nut members to be installed upon the opposite side of the particular ceiling or roofing structure, the externally threaded hanger rods are then threadedly engaged within the internally threaded socket members of the anchor structures, fixtures, or mounting plates, the water pipes are then inserted within, for example, suspension straps or the like operatively associated with the hanger rods, and lastly, the sprinkler heads are mounted upon the water pipes. It can therefore be appreciated that the installation process for such water sprinkler systems is not only labor-intensive, but quite tedious and time-consuming in view of the fact that the nut members of the anchor structures, fixtures, or mounting plates need to be separately upon the screws or bolt fasteners from the opposite side of the ceiling or roofing structure.

Figure 1:
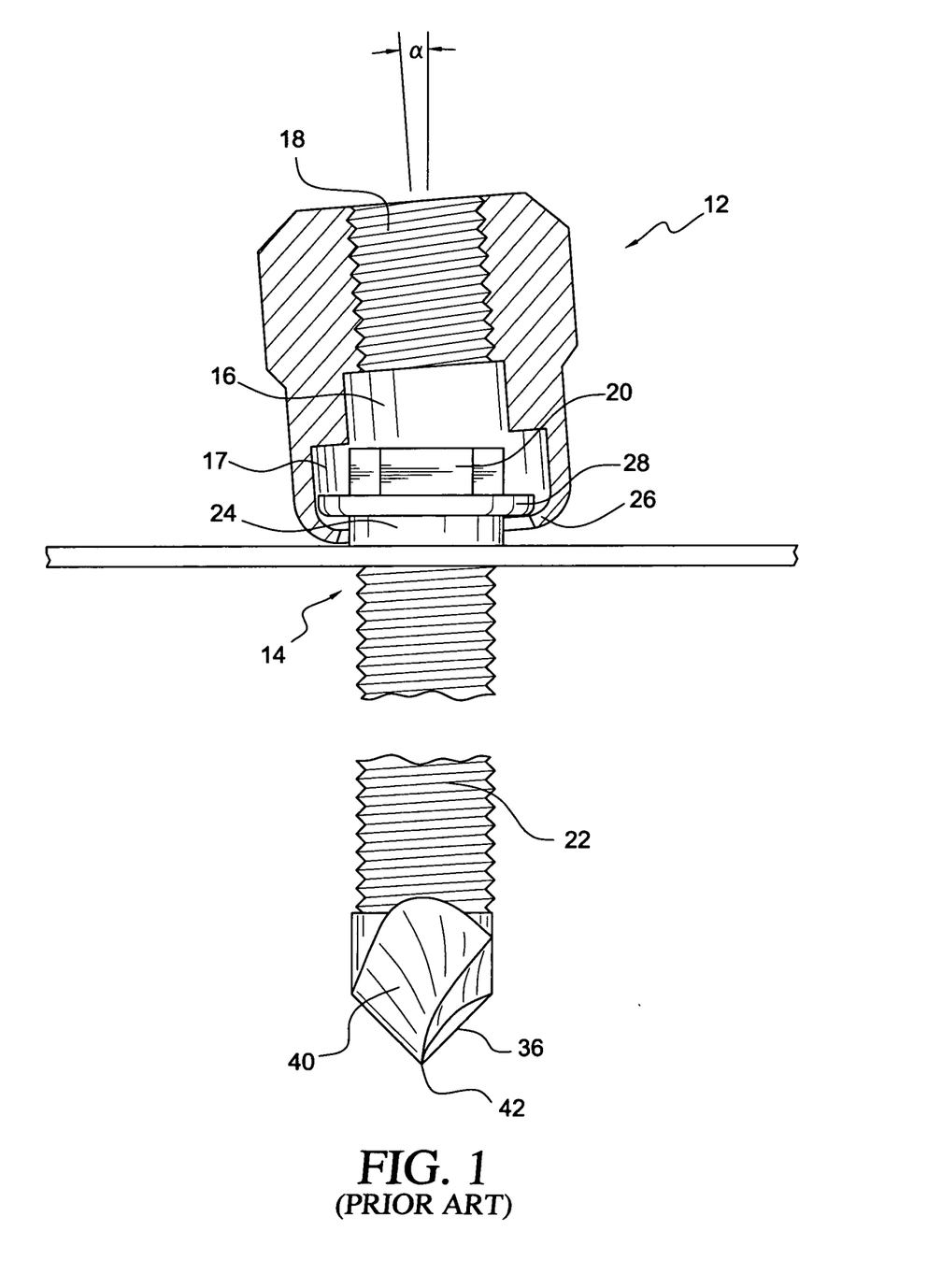
FIG. 1 is a cross-sectional view of a conventional, PRIOR ART anchor assembly wherein the nut member of the anchor assembly is capable of undergoing only limited pivotal or swiveled angular rotation with respect to the externally threaded screw fastener of the anchor assembly.

Still further, as is also well known in the art and industry, it is often required to hang or suspend the various aforenoted system components from a ceiling or roofing structure which is disposed at a predetermined angle with respect to the floor structure. Accordingly, as a result of the anchor structures, fixtures, or mounting plates being affixed to such angled ceilings or roof structures, the hanger rods will effectively extend substantially perpendicular to the plane of the ceiling or roofing structure and will therefore not be disposed in a plumb manner substantially perpendicular to the floor structure of the industrial or commercial establishment. Therefore, when, in turn, the various components, such as, for example, the electrical conduits, heating units, water pipes, or the like, are mounted upon the ceiling or roofing structures by means of the hanger rods, the anchor structures, fixtures, or mounting plates, through means of the non-plumb hanger rods, will exert undesirable moment arms or torque upon the anchor structures, fixtures, or mounting plates, through means of the non-plumb hanger rods, which will enhance structural fatigue and stress into the mounting systems. One type of anchor system which has sought to effectively overcome the operational drawbacks or disadvantages of such conventional, prior art anchor structures, fixtures, or mounting plates, is disclosed within U.S. Pat. No. 6,443,680 which issued to Bodin on Sep. 3, 2002. As can best be seen within FIG. 1, which substantially corresponds to FIG. 2B of the aforenoted patent to Bodin, an anchor assembly 10 is seen to comprise an anchor 14 and a cap 12. The anchor 14 comprises a threaded shaft portion 22, a drill point 36 having helically oriented flutes 40 and a pointed tip 42, a head portion 20, and a washer 28 and collar 24 interposed between the head portion 20 and the threaded shank portion 22. The cap 12 is secured to the anchor 14 by means of a swaged lip portion 26 and comprises a bore 16, within which the head portion 20 is adapted to be disposed when the anchor 14 is to be inserted and mounted upon a ceiling or roofing structure, and a counterbore 17 into which the washer 28 and the head portion 20 can be moved so as to permit the cap 12 to be pivotally moved with respect to the anchor 14 within a predeterminedly limited angular range denoted by means of the symbol α. The cap 12 also comprises an internally threaded bore 18 so as to accommodate a hanger or other mounting structure. As can therefore be readily appreciated, while the anchor assembly 10 is operationally satisfactory, as has been noted hereinbefore, and is capable of undergoing rotational movement around the longitudinal axis of the anchor 14, the cap 12 is only capable of pivotal movement with respect to the anchor 14 within the aforenoted limited range of movement denoted by means of the symbol α which therefore, in turn, limits the number or different types of applications in connection with which the anchor assembly 10 can be utilized.

Still yet further, in connection with the suspension of the various aforenoted system components, there are certain environmental situations, that is, the various system components are to be utilized within particular commercial, industrial, manufacturing, or operational environments, wherein the various aforenoted system components, in addition to merely being suspended, are also required to effectively be positionally restrained. In addition, as was the case with the non-restrained suspended components, it is desirable to be capable of installing the suspended and positionally restrained components in a relatively easy manner and within a relatively short time-frame.

A need therefore exists in the art for a new and improved anchor assembly, mounting system, fixture, or the like, which can be readily and easily installed without the need for performing time-consuming, tedious installation procedures, a need also exists in the art for a new and improved anchor assembly, mounting system, fixture, or the like which can exhibit or provide a relatively large range of movement, such as, for example, up to 180° of pivotal or rotational movement or motion, and still further, a need exists in the art for a new and improved positional restraint system for suspended components.

SUMMARY OF THE INVENTION

The foregoing and other objectives are achieved in accordance with the teachings and principles of the present invention through the provision of a new and improved anchor assembly, mounting system, fixture, or the like which comprises, in accordance with a first embodiment, an externally threaded screw fastener which is adapted to be inserted into a ceiling or roofing structure, and an anchor member which comprises an internally threaded, axially collapsible nut-type rivet threadedly engaged upon the externally threaded screw fastener such that when the externally threaded screw fastener is rotated relative to the internally threaded, axially collapsible nut-type rivet anchor member, the internally threaded, axially collapsible nut-type rivet anchor member will collapse axially with respect to the externally threaded screw fastener, and expand radially outwardly, thereby fixedly mounting the anchor assembly upon the ceiling or roofing structure.

In addition, an internally threaded nut member is effectively mounted upon the upper shank portion of the externally threaded screw fastener, within the vicinity of the head portion of the externally threaded screw fastener, and is provided with at least one slot member which is defined within a side wall portion of the internally threaded nut member. In this manner, not only can the internally threaded nut member rotate around the axis of the externally threaded screw fastener, but in addition, is effectively permitted to swivel or pivot with respect to the externally threaded screw fastener within an angular range of motion of approximately 0°-90°. A second slot can also be provided within a diametrically opposed side wall portion of the internally threaded nut member so as to provide the internally threaded nut member with an angular range of motion of approximately 0°-180°. A separate, externally threaded rod member, operatively associated with suitable hanger equipment for, for example, hanging or suspending water pipes for supplying water to automatic water sprinkler heads, may then be threadedly engaged within the internally threaded nut member. A modified embodiment of this first embodiment of the new and improved anchor assembly, mounting system, fixture, or the like, of the present invention comprises the incorporation of a suitable drill point upon the forward end portion of the externally threaded screw fastener for permitting the anchor assembly, mounting system, fixture, or the like, to be inserted into different substrates.

Furthermore, a first alternative embodiment of the new and improved anchor assembly, mounting system, fixture, or the like, of the present invention comprises the use of a cable or similar structure for operatively connecting the internally threaded nut member to the head portion of the externally threaded screw fastener. A second alternative embodiment of the new and improved anchor assembly, mounting system, fixture, or the like, of the present invention comprises the use of a second, internally threaded nut member operatively connected to the first internally threaded nut member, mounted upon the externally threaded screw fastener, by means of a threaded stud member, and a bail member, pivotally mounted upon the second nut member, for operatively connecting or mounting the separate, externally threaded rod member, operatively associated with suitable hanger equipment, onto the anchor assembly comprising the first and second internally threaded nut members and the externally threaded screw fastener. A third alternative embodiment of the new and improved anchor assembly, mounting system, fixture, or the like, of the present invention comprises the use of a hoop or link member effectively captured upon a relatively small diameter, non-threaded shank portion of the externally threaded screw fastener so as to be freely movable and pivotal thereon. A fourth alternative embodiment of the new and improved anchor assembly, mounting system, fixture, or the like, of the present invention comprises the use of a headed rod member, which has an internally threaded socket portion defined within the free end portion thereof for receiving the separate, externally threaded rod member operatively associated with suitable hanger equipment, wherein the head rod member is effectively captured within the internally threaded nut member, to be mounted upon the externally threaded screw fastener, so as to not only be freely rotatable about its own axis but also freely movable in a pivotal manner therewithin around a pair of mutually orthogonal axes.

In connection with the restraint systems for the suspended components, a first embodiment of a new and improved component restraint system, as constructed in accordance with the principles and teachings of the present invention, comprises the use of suspension wire wrapped around the component to be suspended, and wherein the opposite ends of the suspension wire are effectively threaded or routed through openings or eyelets formed within suitable fasteners or anchor assemblies, such as, for example, any one of the aforenoted anchor assemblies, mounting systems, fixtures, or the like. In accordance with a second embodiment of a new and improved component restraint system as constructed in accordance with the principles and teachings of the present invention, in lieu of the use of the suspension wire characteristic of the first embodiment component restraint system, the second embodiment component restraint system utilizes a pair of rigid threaded rods which are operatively connected to a U-clamp member through means of a saddle clamp connector.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein:

FIG. 2 is a perspective view of a first embodiment of a new and improved anchor assembly, constructed in accordance with the principles and teachings of the present invention, wherein the same comprises a slotted nut member, mounted upon an externally threaded screw fastener which is adapted to be fixedly secured upon ceiling or roofing structure by means of an axially collapsible, radially expandable, rivet-type anchor, wherein the slotted nut member is capable of undergoing pivotal or angular movement, with respect to the externally threaded screw fastener and the axially collapsed, rivet-type anchor, within an angular range of movement of at least approximately 0°-90°, and wherein further, a separate, externally threaded rod member, operatively associated with suitable hanger equipment for, for example, hanging or suspending water pipes for supplying water to automatic water sprinkler heads, is adapted to be threadedly engaged within the slotted nut member;

FIG. 10 is a schematic view of a first embodiment of a new and improved component restraint system, as constructed in accordance with the principles and teachings of the present invention, which comprises the use of suspension wire for suspending components to be suspended wherein the opposite ends of the suspension wire are effectively threaded or routed through openings or eyelets formed within suitable fasteners or anchor assemblies, such as, for example, any one of the aforenoted anchor assemblies, mounting systems, fixtures, or the like;

DETAILED DESCRIPTION OF THE ILLUSTRATED EMBODIMENTS

Figure 2:
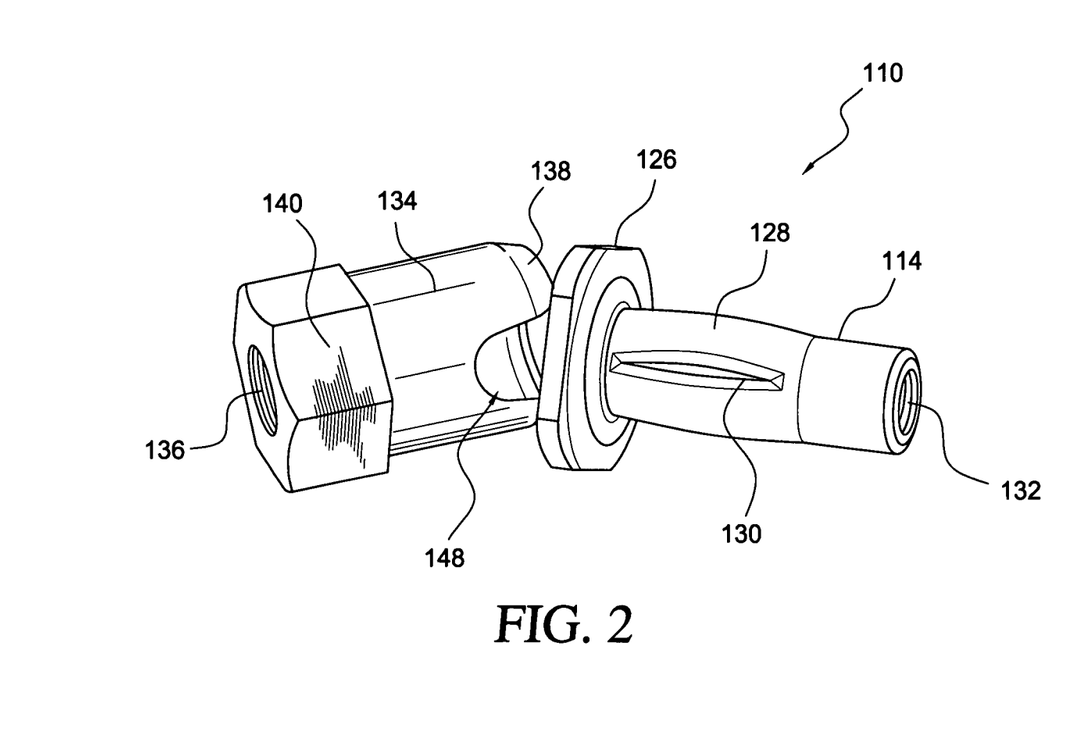
Figure 3:
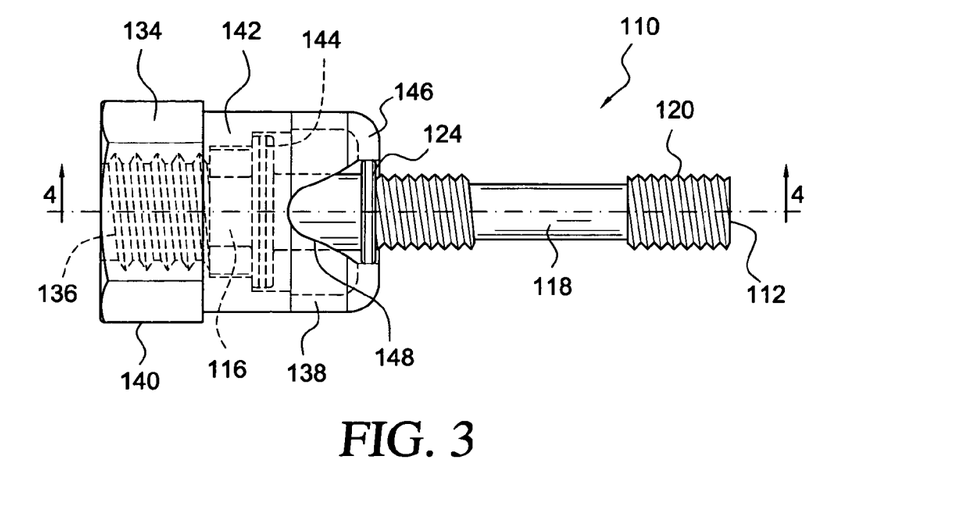
FIG. 3 is a side elevational view, partly in cross-section, of the new and improved anchor assembly, as disclosed within FIG. 2, without the axially collapsible, rivet-type anchor, and showing, in particular, the slotted nut member interconnected to the externally threaded screw fastener.
Figure 4:
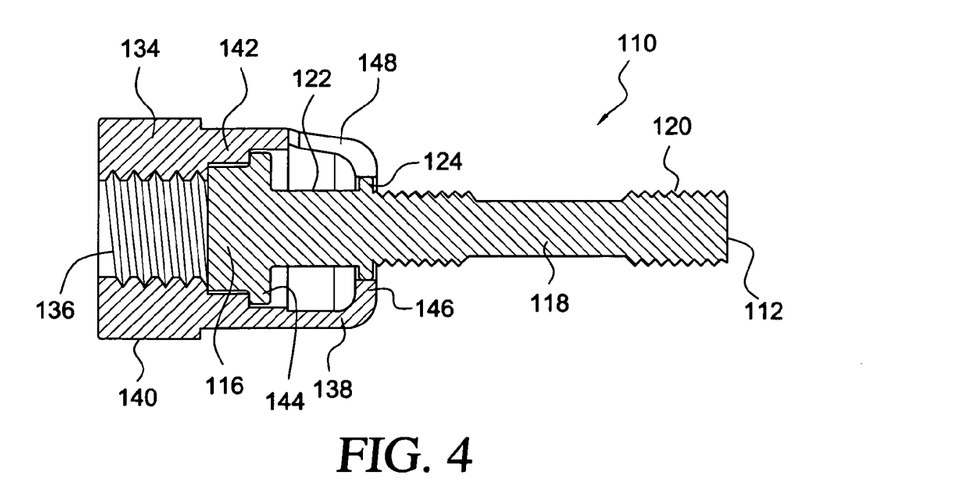
FIG. 4 is a cross-sectional view of the anchor assembly as illustrated within FIG. 3 and as taken along the lines 4-4 of FIG. 3.

Referring now to the drawings, and more particularly to FIGS. 2-4 thereof, a first embodiment of a new and improved anchor assembly, constructed in accordance with the principles and teachings of the present invention, is disclosed and is generally indicated by the reference character 110. More particularly, the anchor assembly 110 comprises an externally threaded screw fastener 112, and an axially collapsible, radially expandable, rivet-type anchor 114. As can best be appreciated from FIGS. 3 and 4, the externally threaded screw fastener 112 comprises a hexagonally configured head portion 116, a shank member 118, a first externally threaded portion 120 formed along the entire axial extent of a forward section of the shank member 118, or alternatively, disposed only partially upon the forward distal end portion of the shank member 118, a second non-threaded shank portion 122 formed upon the section of the shank member 118 which is disposed within the vicinity of the head portion 116, and a first annular flanged portion 124 formed upon the shank member 118 at an axial position which effectively separates the first externally threaded shank portion 120 from the second non-threaded shank portion 122. As can best be seen in FIG. 2, the axially collapsible, radially expandable, rivet-type anchor 114 comprises a base member 126, and an axially extending tubular section 128 which is adapted to accommodate the first externally threaded portion 120 of the externally threaded screw fastener 112 when the first externally threaded portion 120 of the externally threaded screw fastener 112 is inserted into the axially extending tubular section 128 of the axially collapsible, radially expandable, rivet-type anchor 114. The axially extending tubular section 128 of the axially collapsible, radially expandable, rivet-type anchor 114 is provided with a plurality of slots 130, such as, for example, four slots, only one of which is visible, within circumferentially spaced side wall portions thereof, and the distal end portion of the axially extending tubular section 128 of the axially collapsible, radially expandable, rivet-type anchor 114 is internally threaded as at 132 so as to be capable of being threadedly engaged upon the distal end portion of the first externally threaded portion 120 of the externally threaded screw fastener 112 when the first externally threaded portion 120 of the externally threaded screw fastener 112 is in fact inserted into the axially extending tubular section 128 of the axially collapsible, radially expandable, rivet-type anchor 114.

It will be appreciated that after the first externally threaded portion 120 of the externally threaded screw fastener 112 has in fact been inserted into the axially extending tubular section 128 of the axially collapsible, radially expandable, rivet-type anchor 114, and the distal ones of the external threads of the first externally threaded portion 120 of the externally threaded screw fastener 112 begin to engage the internal threads 132 of the axially collapsible, radially expandable, rivet-type anchor 114 as a result of relative rotation between the externally threaded screw fastener 112 and the axially collapsible, radially expandable, rivet-type anchor 114, the axially collapsible, radially expandable, rivet-type anchor 114 will effectively move or translate along the first externally threaded portion 120 of the externally threaded screw fastener 112 until the base member 126 of the axially collapsible, radially expandable, rivet-type anchor 114 is effectively seated upon the first annular flanged portion 124 of the externally threaded screw fastener 112. Subsequently, as relative rotation of the externally threaded screw fastener 112 is continued with respect to the axially collapsible, radially expandable, rivet-type anchor 114, continued movement or translation of the internally threaded, distal end portion 132 of the axially collapsible, radially expandable, rivet-type anchor 114 along the first externally threaded portion 120 of the externally threaded screw fastener 112 will cause the slotted axially extending tubular section 128 of the axially collapsible, radially expandable, rivet-type anchor 114 to effectively axially collapse and radially expand. In this manner, when the anchor assembly 110 is inserted, for example, within an aperture formed within ceiling or roofing structure, the ceiling or roofing structure will effectively be trapped between the base member 126 and the axially collapsed, radially expanded slotted tubular section 128 of the axially collapsible, radially expandable, rivet-type anchor 114 thereby fixedly mounting the anchor assembly 110 within or upon the ceiling or roofing structure.

Continuing further, it is seen that the first embodiment of the new and improved anchor assembly 110 also comprises a nut member 134 which has an internally threaded bore 136 formed within one axial end portion thereof for threadedly accommodating or engaging a separate, externally threaded hanger rod member of a hanger assembly used, for example, for supporting water pipes operatively associated with an automatic water sprinkler system, and a domed section 138 formed upon the opposite axial end portion thereof for effectively accommodating, housing, and retaining the head portion 116 of the externally threaded screw fastener 112 therewithin. More particularly, it is seen that the axial end portion of the nut member 134, within which the internally threaded bore 136 is defined, has a hexagonally configured external surface portion 140 so as to permit the same to be engaged by means of a suitable wrench-type tool in order to impart rotational torque thereto, and a hexagonally configured internally stepped portion 142 for not only engaging the hexagonally configured head portion 116 of the externally threaded screw fastener 112 so as to effectively transmit rotational torque thereto, but, in addition, can also effectively be seated upon a second, annularly round flanged or washer-type portion 144 of the externally threaded screw fastener 112 which is integrally formed with the hexagonally configured head portion 116 of the externally threaded screw fastener 112.

Still yet further, it is seen that the domed section 138 of the nut member 134 has a radially inwardly turned, forwardly disposed portion 146 which, when the nut member 134 is moved axially toward the left, as can best be appreciated from FIG. 4, will engage the second flanged or washer-type portion 144 of the externally threaded screw fastener 112 so as to effectively retain the head portion 116 of the externally threaded screw fastener 112 at its captured state within the domed section 138 of the nut member 134. Lastly, it is also seen that in accordance with the principles and teachings of the present invention, a slot 148 is defined within a side wall portion of the nut member 134. Accordingly, as can best be appreciated from FIG. 2, the slot 148 can effectively accommodate, for example, the non-threaded shank portion 122 of the externally threaded screw fastener 112 so as to permit the nut member 134 to be disposed at an angular orientation with respect to the longitudinal axis of the externally threaded screw fastener 112. In particular, the nut member 134 is therefore not only capable of being rotated around the axis of the externally threaded screw fastener 112, but in addition, will be capable of being disposed at an angular orientation with respect to the longitudinal axis of the externally threaded screw fastener 112 which will be within a range of approximately 0-90°. It is also to be noted that a second slot, not shown but similar to the slot 148, could likewise be provided within a diametrically opposed side wall portion of the nut member 134 so as to provide the nut member 134 with an angular range of movement, with respect to the longitudinal axis of the externally threaded screw fastener 112, which would be within a range of approximately 0-180°.

Figure 5:
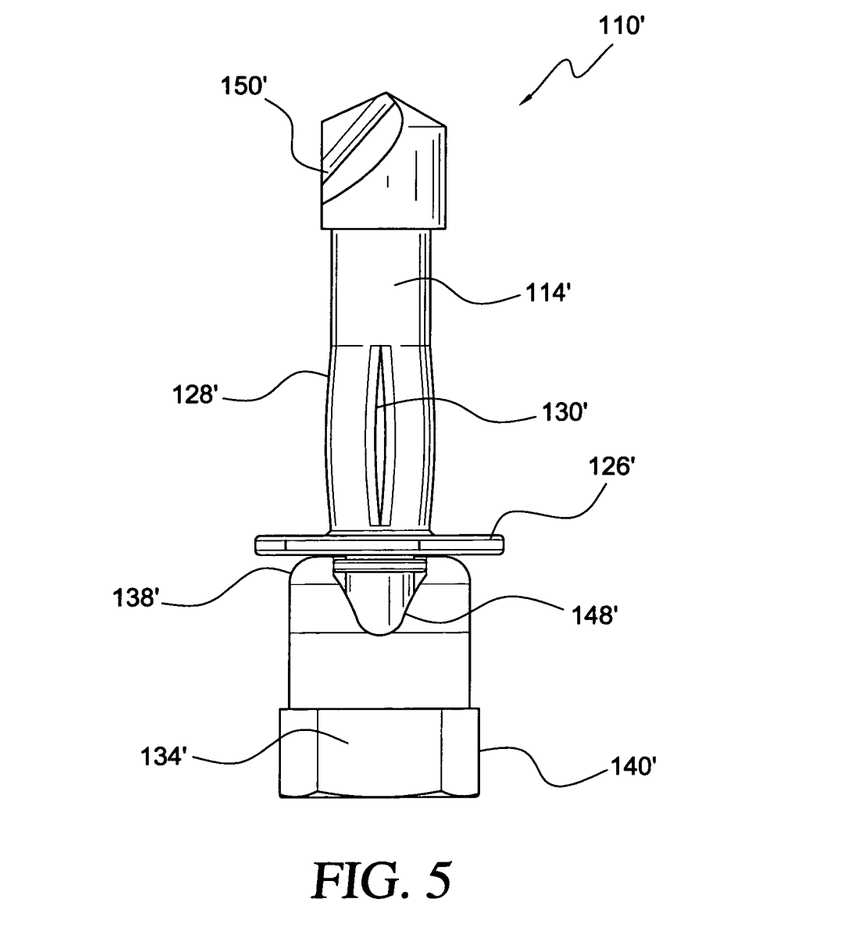
FIG. 5 is a side elevational view of modified embodiment of the first embodiment of the new and improved anchor assembly as disclosed within FIG. 2, wherein the modified embodiment comprises the incorporation of a suitable drill point upon the forward end portion of the externally threaded screw fastener for permitting the anchor assembly to be inserted into different substrates.

With reference now being made to FIG. 5, a modified embodiment of the first embodiment of the new and improved anchor assembly, as disclosed within FIGS. 2-4, and as also constructed in accordance with the principles and teachings of the present invention, is disclosed and is generally indicated by the reference character 110'. It is initially noted that in view of the fact that the modified embodiment anchor assembly 110' is substantially the same as the new and improved anchor assembly 110 as disclosed within FIGS. 2-4, except as will be discussed hereinafter, a detailed description of the modified embodiment anchor assembly 110' will be omitted for brevity purposes. In addition, it is further noted that in view of the similarities between the new and improved anchor assembly 110, as disclosed within FIGS. 2-4, and the modified embodiment anchor assembly 110', component parts of the modified embodiment anchor assembly 110', which correspond to similar component parts of the new and improved anchor assembly 110 as disclosed within FIGS. 2-4, will be designated by corresponding reference characters except that they will be denoted by means of a ('). Accordingly, it is to be noted that the only significant difference between the new and improved anchor assembly 110, as disclosed within FIGS. 2-4, and the modified embodiment anchor assembly 110' resides in the fact that the modified embodiment anchor assembly 110' incorporates the use of a suitable drill point 150' which is threadedly engaged upon the forward end portion of the externally threaded screw fastener 112' for permitting or facilitating the modified embodiment anchor assembly 110' to be inserted into different substrates such as, for example, steel roof decks and purlins.

Figure 6:
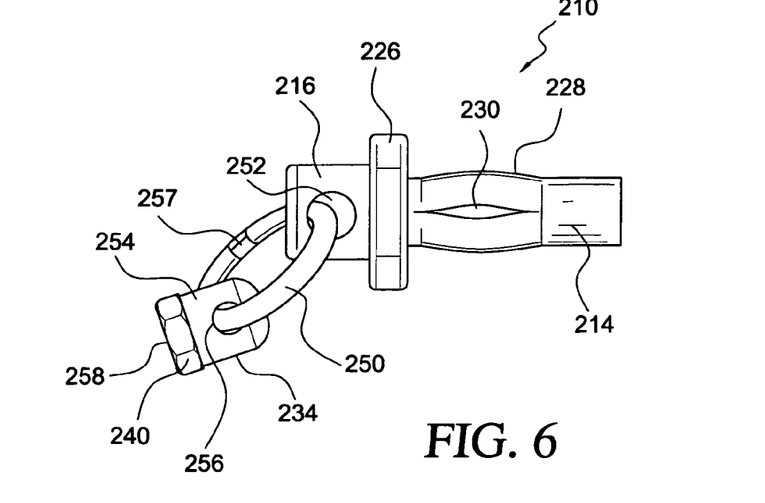
FIG. 6 is a schematic side elevational view of a first alternative embodiment of a new and improved anchor assembly, constructed in accordance with the principles and teachings of the present invention, wherein the same comprises a cable or similar structure for operatively connecting the head portion of the externally threaded screw fastener to the internally threaded nut member to which a separate, externally threaded rod member, operatively associated with suitable hanger equipment for, for example, hanging or suspending water pipes for supplying water to automatic water sprinkler heads, is adapted to be threadedly engaged.

With reference now being made to FIG. 6, a first alternative embodiment of a new and improved anchor assembly, constructed in accordance with the principles and teachings of the present invention, is disclosed and is generally indicated by means of the reference character 210. Again, as was the case with the modified embodiment anchor assembly 110', component parts of the first alternative embodiment anchor assembly 210, which correspond to similar component parts of the new and improved anchor assembly 110 as disclosed within FIGS. 2-4, will be designated by corresponding reference characters except that they will be within the 200 series. More particularly, it is seen that contrary to the first embodiment anchor assembly 110 as disclosed, for example, within FIGS. 2-4, wherein the nut member 134 was effectively mounted upon the head portion 116 of the externally threaded screw fastener 112, the nut member 234 of the first alternative embodiment anchor assembly 210 is not in fact mounted upon the head portion 216 of the externally threaded screw fastener, however, in accordance with the teachings and principles of the second embodiment anchor assembly 210, the nut member 234 is adapted to be connected to the head portion 216 of the externally threaded screw fastener by means of a cable, closed link member, or the like, 250.

More particularly, it is seen that the head portion 216 of the externally threaded screw fastener is provided with a through-aperture 252, and the central body portion 254 of the nut member 234 is likewise provided with a similar through-aperture 256, the cable, closed link member, or the like 250 therefore passing through the through-apertures 252, 256 respectively formed within the head portion 216 of the externally threaded screw fastener and the central body portion 254 of the nut member 234 so as to interconnect the head portion 216 of the externally threaded screw fastener and the central body portion 254 of the nut member 234 together. The opposite ends of the cable, link member, or the like, may then of course be brazed, die cast, or otherwise secured together as at 257, so as to in fact complete or define the endless or closed structure for the cable, link member, or the like. It is further noted that an internally threaded bore, not visible but similar to the internally threaded bore 136 of the nut member 134, is provided within the end portion of the nut member 234, commencing at the external surface portion 258 of the nut member 234, for receiving an externally threaded hanger rod which is adapted to be operatively associated with a hanger assembly used, for example, for supporting water pipes operatively associated with an automatic water sprinkler system. It can therefore be appreciated that, in a manner similar to the mounting of the nut member 134 upon the head portion 116 of the externally threaded screw fastener 112 of the first embodiment anchor assembly 110, the nut member 234 is freely movable with respect to, for example, the longitudinal axis of the externally threaded screw fastener of the first alternative embodiment anchor assembly 210, so as to be capable of achieving angular movements which may be within a range of angular movement of 0-180°. It is lastly noted that, as was the case with the modified embodiment anchor assembly 110', the externally threaded screw fastener of the first alternative anchor assembly 210 can likewise be provided with a self-drilling or gimlet pointed tip member similar to the self-drilling or gimlet pointed tip member 150' of the modified embodiment anchor assembly 110'.

Figure 7:
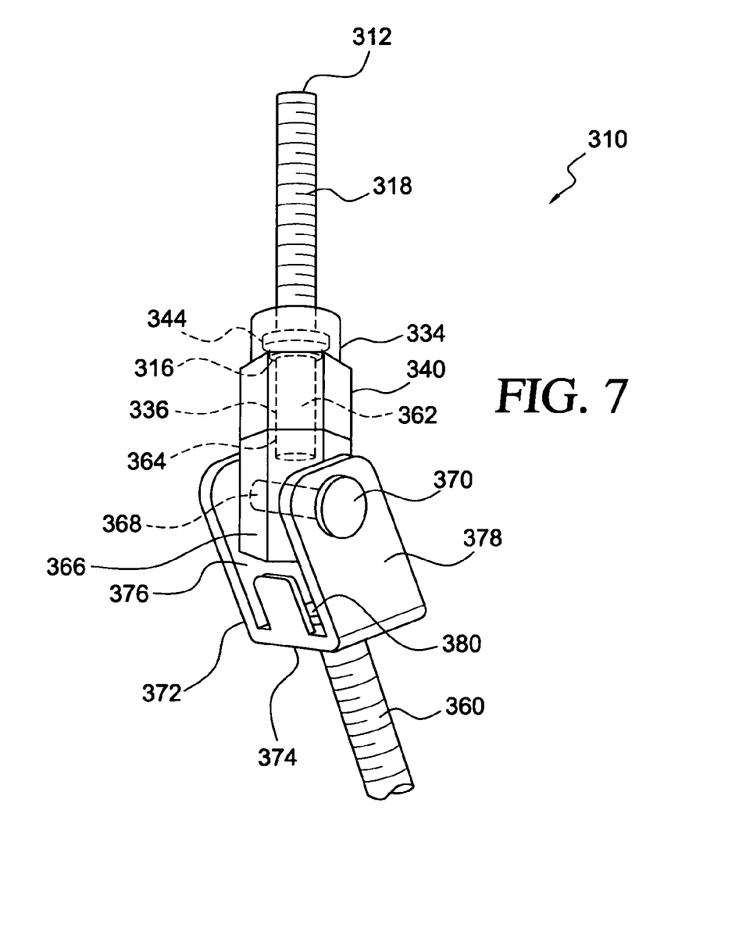
FIG. 7 is a schematic perspective view of a second alternative embodiment of a new and improved anchor assembly, constructed in accordance with the principles and teachings of the present invention, wherein the same comprises the use of a pivotal bail member and a second nut member for operatively connecting or mounting a separate, externally threaded rod member, operatively associated with suitable hanger equipment, onto the first internally threaded nut member attached to the externally threaded screw fastener.

With reference now being made to FIG. 7, a second alternative embodiment of a new and improved anchor assembly, constructed in accordance with the principles and teachings of the present invention, is disclosed and is generally indicated by means of the reference character 310. Again, as was the case, for example, with the modified embodiment anchor assembly as disclosed within FIG. 5, or in connection with the first alternative embodiment anchor assembly 210 as disclosed within FIG. 6, component parts of the second alternative embodiment anchor assembly 310, which substantially correspond to similar component parts of the first embodiment anchor assembly 110, as disclosed within FIGS. 2-4, will be designated by corresponding reference characters except that they will be within the 300 series. More particularly, it is seen that in accordance with the principles and teachings of the second alternative embodiment anchor assembly 310 of the present invention, the externally threaded screw fastener 312 and the nut member 334 are correspondingly similar or substantially identical to the externally threaded screw fastener 112 and the nut member 134 of the first embodiment anchor assembly 110 as disclosed in FIGS. 2-4.

However, it is also noted that in lieu of the externally threaded hanger rod 360, which is adapted to be operatively associated with a hanger assembly used, for example, for supporting water pipes operatively associated with an automatic water sprinkler system, being disposed within the internally threaded bore 336 of the nut member 334, as was the case of such hanger rod being disposed within the internally threaded bore 136 of the nut member 134 of the first embodiment anchor assembly 110 as disclosed within FIGS. 2-4, one end of an externally threaded stud member 362 is in fact adapted to be disposed within the internally threaded bore 336 of the nut member 334, while the opposite end of the externally threaded stud member 362 is adapted to be disposed within an internally threaded bore 364 defined within a sec- and nut member 366. In addition, a transversely oriented throughbore 368 is also defined within the second nut member 366, and a transversely oriented pivotal mounting pin 370 is adapted to be disposed within the throughbore 368. A bail member 372 comprises a bottom wall member 374 and a pair of oppositely disposed, upstanding ear members 376, 378 wherein each one of the oppositely disposed, upstanding ear members 376, 378 has a through-aperture, not shown, formed therein through which the transversely oriented pivotal mounting pin 370 can be disposed. In this manner, the bail member 372 is adapted to be pivotally mounted upon the second nut member 366. Still yet further, the bottom wall member 374 is provided with a throughbore, not visible, and the externally threaded hanger rod 360, which is adapted to be operatively associated with a hanger assembly used, for example, for supporting water pipes operatively associated with an automatic water sprinkler system, is adapted to be disposed within the throughbore, not visible, defined within the bottom wall member 374 of the bail member 372 and fixedly secured therein by means of, for example, a hex nut 380. Accordingly, it can be appreciated that the bail member 372, and the hanger rod 360 mounted thereon, are free to move within an angular range of movement of at least 0-180°.

Figure 8:
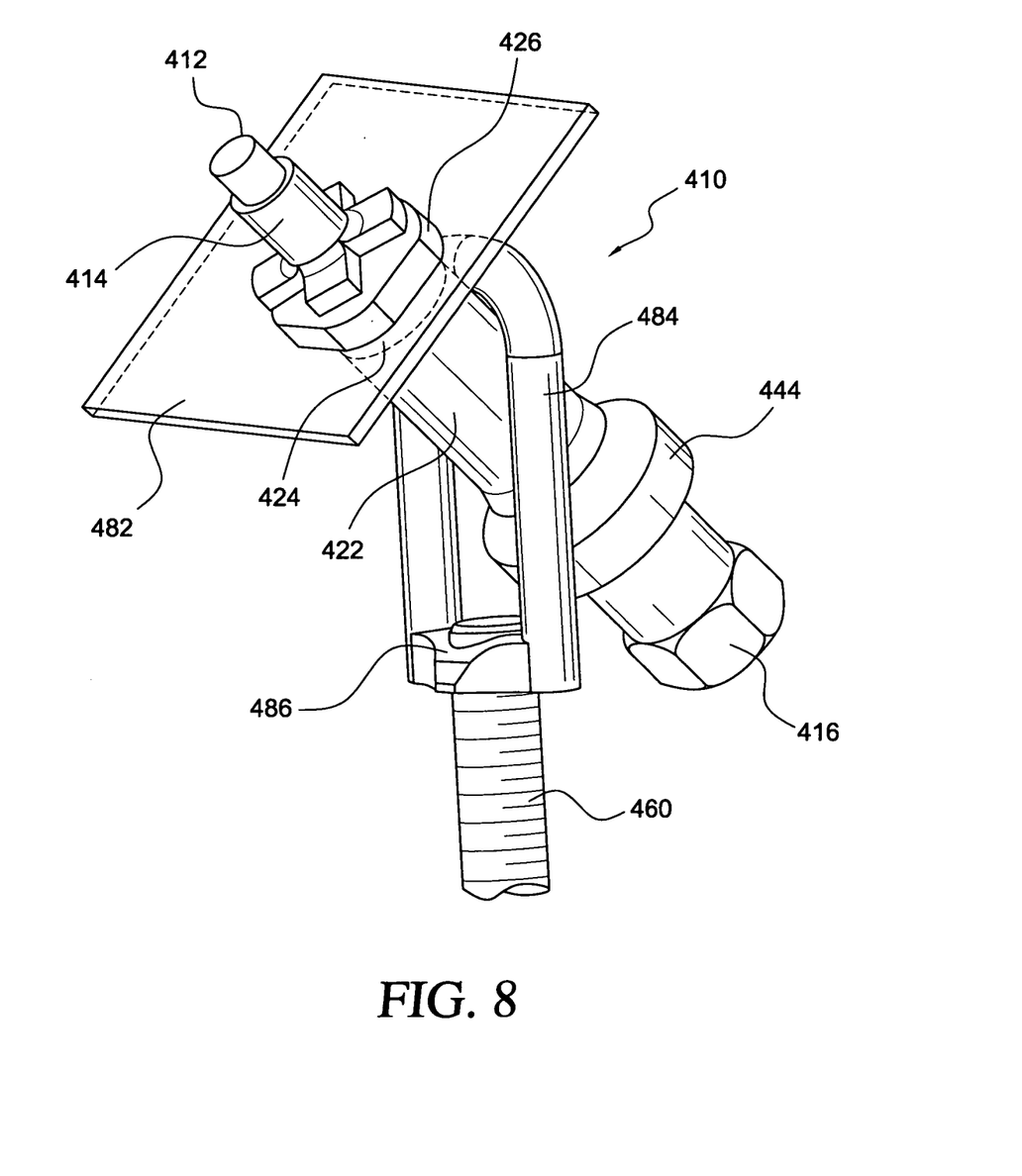
FIG. 8 is a perspective view of a third alternative embodiment of a new and improved anchor assembly, constructed in accordance with the principles and teachings of the present invention, wherein the same comprises the use of a hoop or link member effectively captured upon a relatively small diameter, non-threaded shank portion of an externally threaded screw fastener so as to be freely movable and pivotal thereon, and wherein further, the hoop or link member has an internally threaded member fixedly mounted thereon for threaded reception of a separate, externally threaded rod member, operatively associated with suitable hanger equipment.

Considering now FIG. 8, a third alternative embodiment of a new and improved anchor assembly, constructed in accordance with the principles and teachings of the present invention, is disclosed and is generally indicated by means of the reference character 410. As was the case with the previously described embodiments of the present invention, component parts of the third alternative embodiment anchor assembly 410, which substantially correspond to similar component parts of the previously described embodiment anchor assemblies 110-310, as disclosed within FIGS. 2-7, will be designated by corresponding reference characters except that they will be within the 400 series. More particularly, it is seen that in accordance with the principles and teachings of the third alternative embodiment anchor assembly 410 of the present invention, an externally threaded screw fastener 412 and an axially collapsible, radially expandable rivet-type anchor 414 serve to secure the anchor assembly 410 upon a roofing structure 482, however, it is additionally seen that the third alternative embodiment anchor assembly 410 also comprises a substantially U-shaped link member 484 which is disposed upon a relatively small diameter, non-threaded shank portion 422 of the externally threaded screw fastener 412 so as to effectively be captured between the first and second annular flanged portions 424,444 of the externally threaded screw fastener 412.

Still further, the distal end portions of the substantially U-shaped link member 484 are fixedly connected together by means of an internally threaded nut member 486, which may be secured to the distal end portions of the substantially U-shaped link member 484 by means of any well-known technique, and an externally threaded hanger rod 460, which is adapted to be operatively associated with a hanger assembly used, for example, for supporting water pipes operatively associated with an automatic water sprinkler system, is adapted to be threadedly engaged within the internally threaded nut member 486. It can therefore be appreciated that in view of the fact that the substantially U-shaped link member 484 is freely movable upon the relatively small diameter, non-threaded shank portion 422 of the externally threaded screw fastener 412 within a range of movement of, for example, approximately 90°, the externally threaded hanger rod 460, which is adapted to be operatively associated with a hanger assembly used, for example, for supporting water pipes operatively associated with an automatic water sprinkler system, is capable of hanging in a vertically plumb manner regardless of the particular inclination, for example, of the roofing structure 482.

Figure 9:
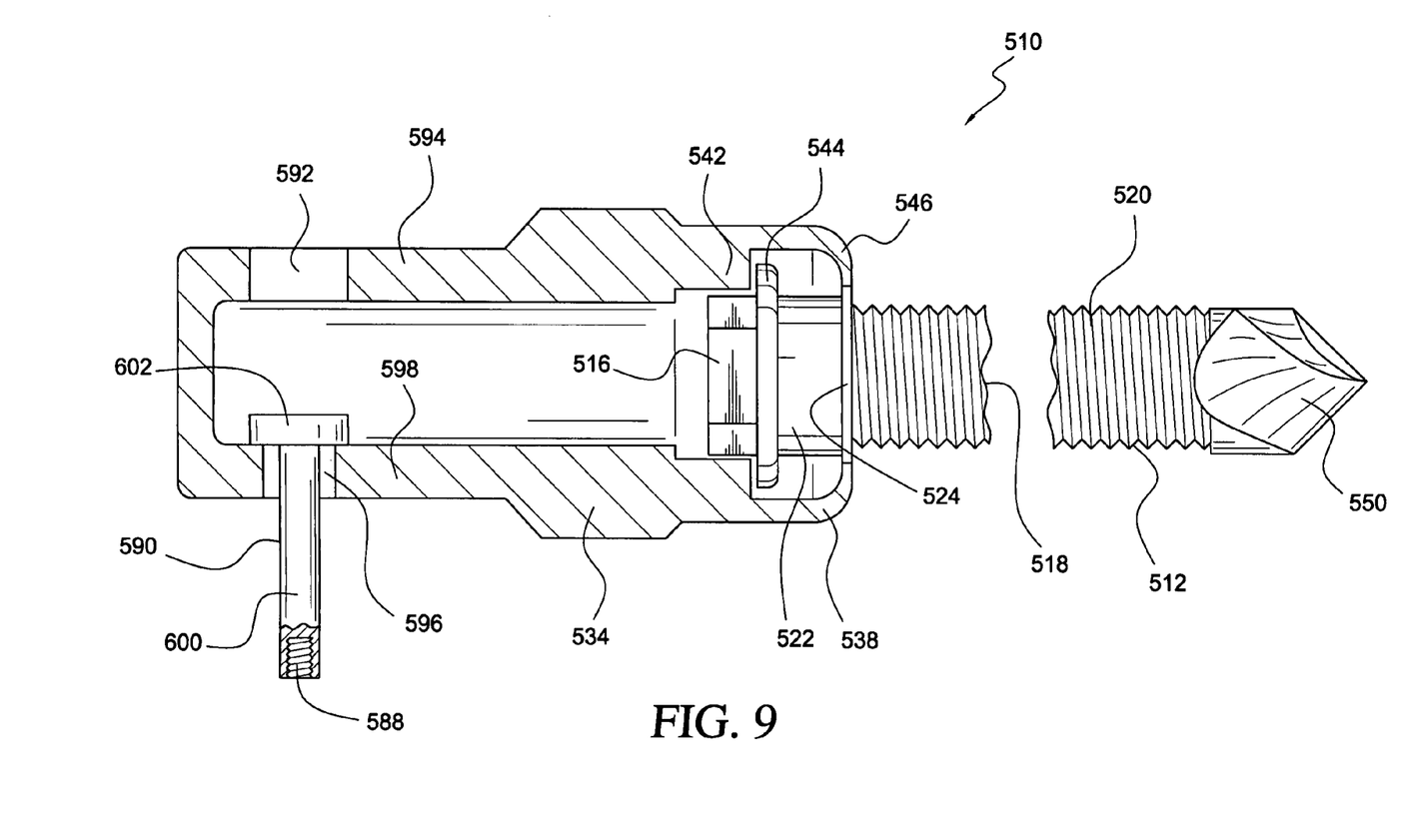
FIG. 9 is a schematic, side elevational view of a fourth alternative embodiment of a new and improved anchor assembly, constructed in accordance with the principles and teachings of the present invention, wherein the same comprises the use of a headed rod member, which has an internally threaded socket portion defined within the free end portion thereof for receiving a separate, externally threaded rod member operatively associated with suitable hanger equipment, and wherein the head rod member is effectively captured within a modified cap member engaged with the headed externally threaded screw fastener so as to not only be freely rotatable about its own axis but in addition, is freely pivotal within the modified cap member around two mutually orthogonal axes.

With reference now being made to FIG. 9, a fourth alternative embodiment of a new and improved anchor assembly, constructed in accordance with the principles and teachings of the present invention, is disclosed and is generally indicated by means of the reference character 510. As was the case with the previously described embodiments of the present invention, component parts of the fourth alternative embodiment anchor assembly 510, which substantially correspond to similar component parts of the previously described embodiment anchor assemblies 110-410, as disclosed within FIGS. 2-8, will be designated by corresponding reference characters except that they will be within the 500 and 600 series. More particularly, it is seen that in accordance with the principles and teachings of the fourth alternative embodiment anchor assembly 510 of the present invention, a modified cap member 534, similar to the nut members 134, 334 respectively disclosed within FIGS. 2-4 and 7, is adapted to be securely mounted upon an externally threaded screw fastener 512 similar to the externally threaded screw fasteners 112,312, however, in lieu of the externally threaded hanger rod, not shown but similar to the externally threaded hanger rods 360, 460 respectively disclosed within FIGS. 7 and 8, being threadedly engaged within an internally threaded bore provided within the modified cap member 534, the externally threaded hanger rod, not shown, is adapted to be threadedly engaged within an internally threaded bore 588 defined within a headed rod member 590 which is adapted to be movably mounted in a relatively free manner internally within the modified cap member 534 so as to achieve angular movement which may be within a range of movement of, for example, 0°-90°. In order to achieve the mounting of the headed rod member 590 upon the cap member 534, a first, relatively large diameter through-aperture 592 is formed within a first side wall portion 594 of the cap member 534, while a second, relatively small diameter through-aperture 596 is formed within a second, diametrically opposite side wall portion 598 of the cap member 534.

The first, relatively large diameter through-aperture 592, formed within the first side wall portion 594 of the cap member 534, has a diametrical extent which is sufficiently large enough in order to permit the entire headed rod member 590 to be inserted therethrough, however, the second, relatively small diameter through-aperture 596, formed within the second side wall portion 598 of the nut member 534, has a diametrical extent which is sufficiently large enough in order to permit only the shank portion 600 of the head rod member 590 to pass therethrough while the head portion 602 of the headed rod member 590 cannot pass therethrough. Therefore, the headed rod member 590 is effectively trapped internally within the cap member 534, and in order to ensure the fact that the headed rod member 590 remains entrapped or captured within the cap member 534, the first side wall portion 594 of the nut member 534 will be deformed so as to, in turn, effectively deform or alter the size or configuration of the first through-aperture 592 formed within the first side wall portion 594 of the cap member 534 whereby the headed rod member 590 can no longer pass, or fall back out of or through the first through-aperture 592. When the externally threaded hanger rod, not shown but similar to the externally threaded hanger rods 360,460 of the anchor assemblies 310,410 disclosed within FIGS. 7 and 8, is then inserted within the internally threaded bore 588 of the headed rod member 590, the externally threaded hanger rod will be capable of not only rotating around the longitudinal axis of the headed rod member 590, but in addition, will be able to pivot about two mutually orthogonal axes so as to, in turn, be capable of hanging in a vertically plumb manner regardless of the particular inclination of the roofing structure within which the anchor assembly 510 is fixedly mounted.

Figure 10:
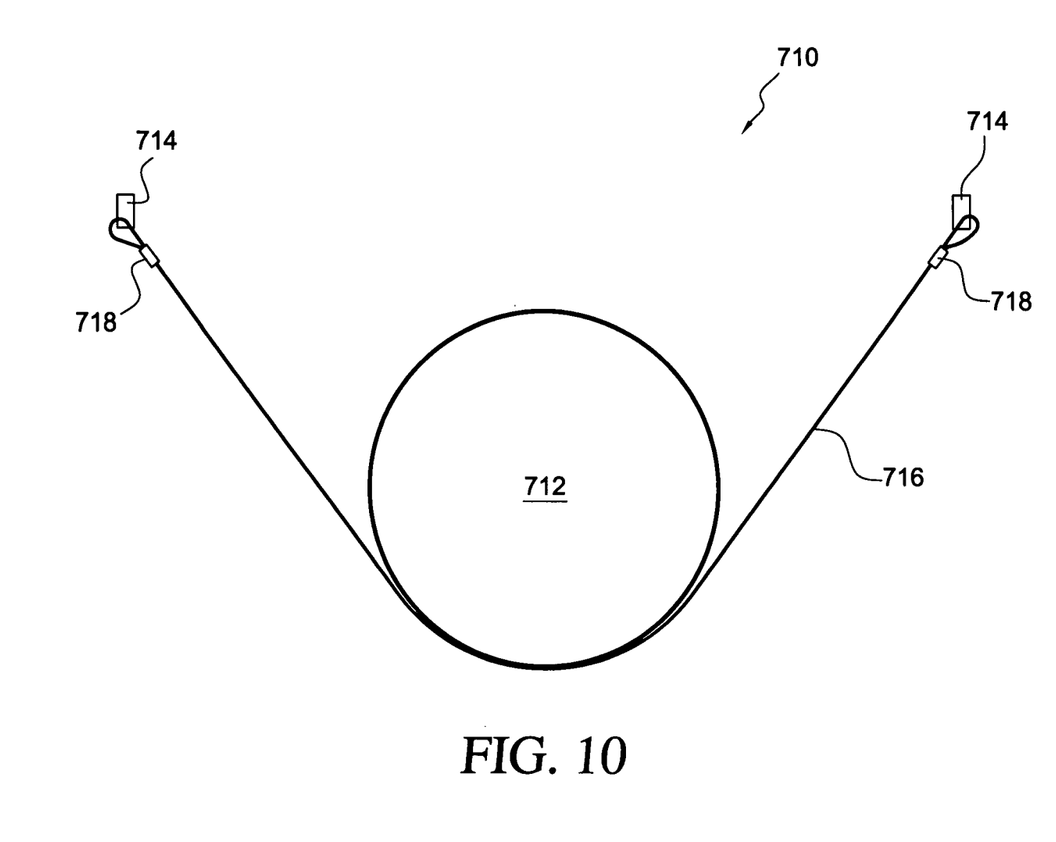

With reference now being made to FIG. 10, a first embodiment of a new and improved component restraint system, as constructed in accordance with the principles and teachings of the present invention, is disclosed and is generally indicated by the reference character 710. More particularly, a component to be suspended from, for example, a ceiling or roofing structure, is disclosed at 712, and in accordance with the principles and teachings of the present invention, a pair of anchor type fastener assemblies 714,714, which may comprise, for example, an anchor assembly similar to any one of the aforenoted anchor assemblies 110-610 disclosed within FIGS. 2-9, are adapted to be fixedly mounted within the ceiling or roofing structure at laterally or transversely spaced positions. In lieu of the use of, for example, an externally threaded hanger rod, such as, for example, an externally threaded hanger rod similar to either one of the externally threaded hanger rods 360,460 as illustrated within FIGS. 7 and 8, in order to suspend the particular component 712, such as, for example, electrical conduits, heating units, water pipes for use in conjunction with automatic water sprinkler systems, or the like, from the ceiling or roofing structure, a suspension wire 716 is used. More particularly, a substantially central portion of the suspension wire 716 is adapted to be wrapped around the component 712 so as to define several wire coils therearound, and subsequently, the opposite divergent portions of the suspension wire 716 are oriented such that free or distal end portions of the suspension wire 716 are adapted to be routed or looped through the openings or eyelets of the pair of anchor assemblies 714,714 whereupon the opposite free or distal end portions of the suspension wire 716 are then fixedly connected to regions of the suspension wire 716 which are disposed adjacent to, or within the vicinity of, the anchor assemblies 714 by means of suitable fasteners 718,718, such as, for example, a crimp seal or the like.

More particularly, when the anchor assemblies 714 comprise, for example, any one of the aforenoted anchor assemblies 110-610, the opposite free or distal end portions of the suspension wire 716 may be routed or looped through the oppositely disposed slots 148 of the anchor assembly 110, through the aperture 256 of the anchor assembly 210, through the bail member 372 of the anchor assembly 310, through the link member 484 of the anchor assembly 410, or through the apertures 592,596 of the cap member 534 of the anchor assembly 510. It can therefore be seen and appreciated that in accordance with the principles and teachings of this first embodiment component restraint system 710, in lieu of the component 712 being freely suspended from the ceiling or roofing structure, the component 712 is not only able to be suspended from the ceiling or roofing structure by means of the anchor assemblies 714,714, comprising, for example, any one of the aforenoted anchor assemblies 110-610, and the suspension wire 716, but in addition, the component 712 is able to be positionally restrained, in a lateral or transverse direction, by means of the suspension wire 716 having its oppositely disposed free or distal end portions mounted within the anchor assemblies 714,714 which may comprise any one of the aforenoted anchor assemblies 110-610.

Figure 11:
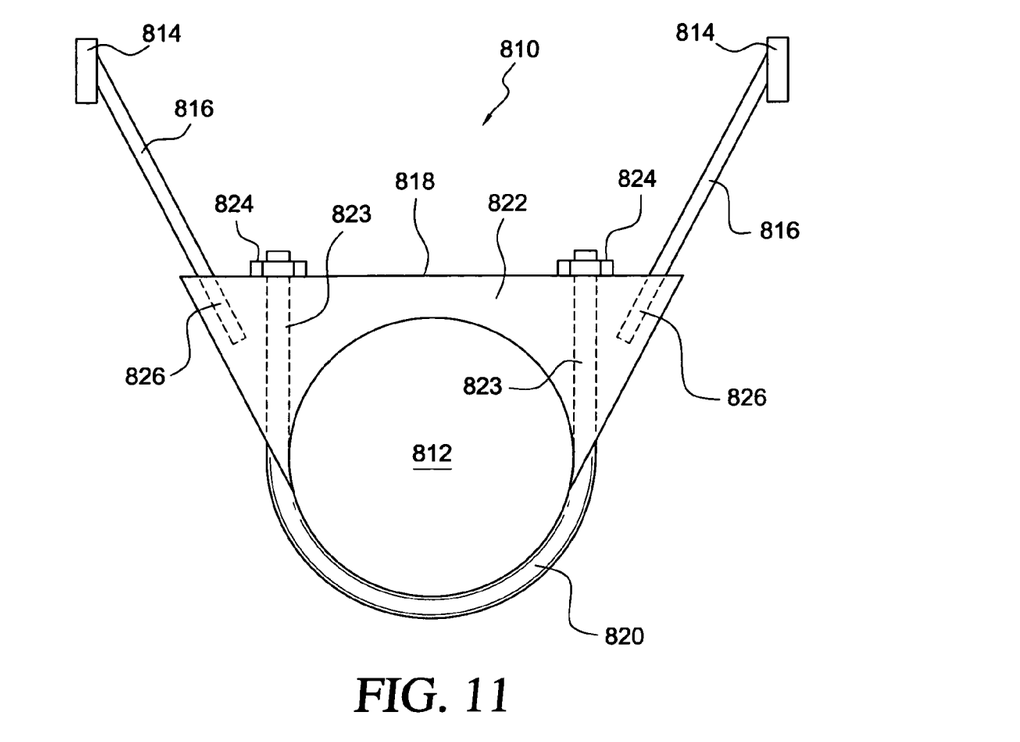
FIG. 11 is a schematic view of a second embodiment of a new and improved component restraint system as constructed in accordance with the principles and teachings of the present invention, which comprises the use of a pair of rigid threaded rods which are operatively connected to a U-clamp member through means of a saddle clamp connector.

With reference lastly being made to FIG. 11, a second embodiment of a new and improved component restraint system, as constructed in accordance with the principles and teachings of the present invention, is disclosed and is generally indicated by the reference character 810. More particularly, a component to be suspended from, for example, a ceiling or roofing structure, is disclosed at 812, and in accordance with the principles and teachings of the present invention, a pair of anchor type fastener assemblies 814,814, which may comprise, for example, an anchor assembly similar to any one of the aforenoted anchor assemblies 110-610 disclosed within FIGS. 2-9, are adapted to be fixedly mounted within the ceiling or roofing structure at laterally or transversely spaced positions. Still further, in conjunction with the anchor assemblies 814,814, which may comprise, for example, an anchor assembly similar to any one of the aforenoted anchor assemblies 110-610 disclosed within FIGS. 2-9, and in order to suspend and restrain the particular component 812, such as, for example, electrical conduits, heating units, water pipes for use in conjunction with automatic water sprinkler systems, or the like, from the ceiling or roofing structure, a pair of externally threaded suspension and restraint rods 816,816, which may be similar to either one of the externally threaded hanger rods 360,460 as illustrated within FIGS. 7 and 8, are adapted to be respectively threadedly engaged within the pair of anchor assemblies 814, 814. Still yet further, a modified saddle clamp assembly 818 is adapted to actually support the component 812 as well as to be fixedly mated or connected to the externally threaded suspension and restraint rods 816,816.

Figure 12:
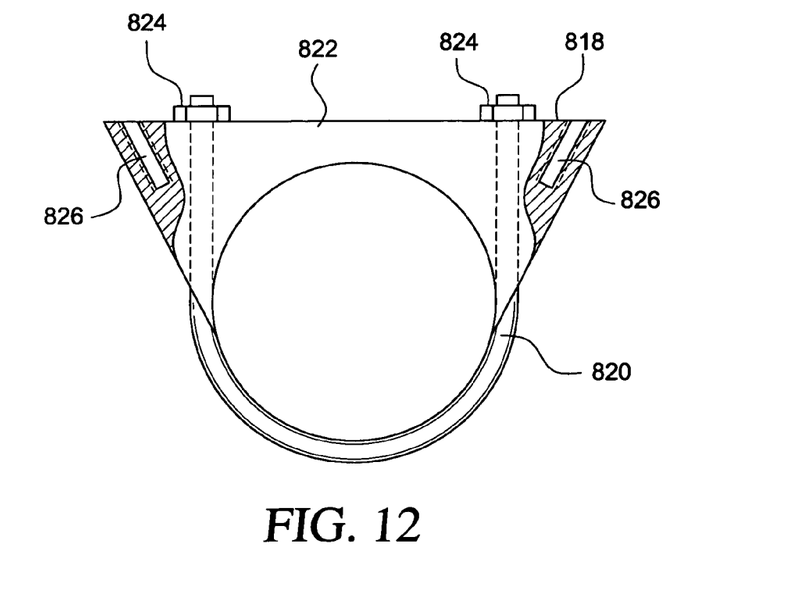
FIG. 12 is a front elevational view, partly in cross-section, of a modified saddle clamp assembly which is to be utilized in conjunction with the second embodiment restraint system as illustrated within FIG. 11 in order to suspend, support, and restrain the particular component mounted upon the ceiling or roofing structure.

More particularly, as can best be seen from FIG. 12, the modified saddle clamp assembly 818 comprises a lower support member 820 which has a substantially U-shaped cross-sectional configuration and which is adapted to be disposed beneath the undersurface portion of the component 812 so as to support the same. In a similar manner, a transversely oriented upper clamping bar 822 is adapted to be disposed atop the component 812, and it is seen that upper, laterally spaced free end leg portions of the U-shaped support member 820 are externally threaded and are adapted to be inserted through through-bores 823,823 defined within the upper clamping bar 822, so as to project upwardly through the through-bores 823,823 in order to respectively threadedly engage a pair of nut members 824,824 so as to fixedly secure the lower U-shaped support member 820 and the upper clamping bar 822 together. In addition, it is also seen that the upper clamping bar 822 is provided with a pair of internally threaded bores 826,826 which are adapted to threadedly receive lower end portions of the externally threaded suspension and restraint rods 816,816. It can therefore be seen and appreciated that in accordance with the principles and teachings of this second embodiment component restraint system 810, and in a manner similar to the first embodiment component restraint system 710, in lieu of the component 812 being freely suspended from the ceiling or roofing structure, the component 812 is not only able to be suspended from the ceiling or roofing structure by means of the anchor assemblies 814,814, comprising, for example, any one of the aforenoted anchor assemblies 110-610, and the suspension and restraint rods 816, 816, but in addition, the component 812 is able to be positionally restrained, in a lateral or transverse direction by means of the suspension and restraint rods 816,816 having their end portions mounted within the anchor assemblies 814, 814 which may comprise any one of the aforenoted anchor assemblies 110-610. Still yet further, in view of the fact that the second embodiment restraint system 810 employs the rigid suspension and restraint rods 816,816 which have their opposite end portions respectively fixedly engaged within the anchor assemblies 814,814 and the modified saddle clamp assembly 818, the entire restraint system 810 comprises a rigidified suspension and restraint system as opposed to the wire suspension system 710 illustrated within FIG. 10.

Thus, it may be seen that in accordance with the principles and teachings of the present invention, there has been disclosed several different embodiments of anchor assemblies which provide enhanced swivel capabilities or angular ranges of movement which may be necessary so as to effectively accommodate various or different system and spatial requirements in connection with the achievement of the hanging or suspension of the various components necessary to the operation of industrial or commercial establishments, such as, for example, electrical conduits, heating units, water pipes for use in conjunction with the automatic water sprinkler systems, or the like. In addition, suspension and restraint systems have also been disclosed for positionally restraining the particular components as required within specific industrial, commercial, or similar environments.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A suspension and restraint system for restraining a suspended component suspendingly supported from an overhead support surface, comprising:

a pair of laterally spaced anchor members adapted to be fixedly mounted within the overhead support surface at laterally spaced positions;

said pair of laterally spaced anchor members respectively having a longitudinal axis, a hanger member for suspending the component from the support surface, and connector structure interconnecting said hanger member to a respective one of said anchor members for permitting said hanger member to be pivotally movable, with respect to said longitudinal axis of said anchor member, throughout a range of movement of substantially 0°-90° with respect to said longitudinal axis of said anchor member such that said hanger member will always be vertically plumb regardless of a particular angular inclination of the support surface upon which the anchor member is fixedly mounted; and structure for interconnecting the component to said pair of laterally spaced anchor members for not only suspendingly supporting the component from the overhead support surface, but in addition, for positionally restraining the component from undergoing movements in opposite lateral directions.

2. The suspension and restraint system as set forth in claim 1, wherein:

said structure interconnecting the component to said pair of laterally spaced anchor members comprises a suspension wire.

3. The suspension and restraint system as set forth in claim 2, wherein:

a substantially central portion of said suspension wire is coiled around the component being suspendingly supported from the overhead support surface.

4. The suspension and restraint system as set forth in claim 3, wherein:

opposite divergent end portions of said suspension wire are respectively fixedly connected to said pair of laterally spaced anchor members.

5. The suspension and restraint system as set forth in claim 4, wherein further:

said opposite end portions of said suspension wire are looped through said pair of laterally spaced anchor members and routed back upon themselves; and fasteners fixedly secure said looped end portions of said suspension wire to said suspension wire at positions adjacent to said looped portions routed through said pair of laterally spaced anchor members.

6. The suspension and restraint system as set forth in claim 1, wherein said structure interconnecting said component to said pair of laterally spaced anchor members comprises:

a saddle clamp assembly surrounding the component being suspendingly supported from the overhead support surface; and a pair of rod members interconnecting said saddle clamp assembly to said pair of laterally spaced anchor members so as to define a rigidified suspension and restraint system.

7. The suspension and restraint system as set forth in claim 6, wherein said saddle clamp assembly comprises:

a substantially U-shaped support member disposed beneath an undersurface portion of the component being suspendingly supported from the overhead support surface; and an upper clamping bar disposed atop the component being suspendingly supported from the overhead support surface.

8. The suspension and restraint system as set forth in claim 7, wherein said upper clamping bar comprises:

a first set of bores defined therein for receiving free end portions of said substantially U-shaped support member; and a second set of internally threaded bores defined therein for threadedly receiving first externally threaded end portions of said pair of rod members, second externally threaded end portions of said pair of rod members being threadedly connected to said pair of laterally spaced anchor members.

9. The suspension and restraint system as set forth in claim 8, wherein:

said first set of bores defined within said upper clamping bar comprise through-bores for permitting said free end portions of said substantially U-shaped support member to pass therethrough;

said free end portions of said substantially U-shaped support member are externally threaded; and internally threaded nut members are threadedly engaged with said externally threaded free end portions of said substantially U-shaped support member so as to fixedly secure said free end portions of said substantially U-shaped support member within said upper clamping bar.

* * * * *